(12) United States Patent
Rosenoer et al.

(10) Patent No.: US 10,742,398 B2
(45) Date of Patent: Aug. 11, 2020

(54) BESPOKE PROGRAMMABLE CRYPTO TOKEN

(71) Applicant: International Business Machines Corporation, Armonk, NY (US)

(72) Inventors: Jonathan M. C. Rosenoer, Westport, CT (US); Stanley W. K. Yong, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 15/979,925

(22) Filed: May 15, 2018

(65) Prior Publication Data

US 2019/0356473 A1    Nov. 21, 2019

(51) Int. Cl.
*H04L 9/06* (2006.01)
*G06Q 20/36* (2012.01)

(52) U.S. Cl.
CPC ....... *H04L 9/0643* (2013.01); *G06Q 20/3678* (2013.01); *G06Q 2220/00* (2013.01); *H04L 2209/38* (2013.01); *H04L 2209/56* (2013.01)

(58) Field of Classification Search
CPC .......... H04L 9/0643; H04L 2209/56; H04L 2209/38; H04L 9/3247; H04L 9/0891; H04L 9/3239; G06Q 20/3678; G06Q 2220/00
See application file for complete search history.

(56) References Cited

U.S. PATENT DOCUMENTS

2016/0330034 A1* 11/2016 Back ............... G06Q 20/06
2017/0300876 A1* 10/2017 Musiala, Jr. ....... G06Q 20/0655

* cited by examiner

*Primary Examiner* — Huan V Doan

(57) ABSTRACT

An example operation may include one or more of receiving proof of performance of an activity from a receiver system, identifying a data block, among a hash-linked chain of data blocks, that includes a bespoke crypto token associated with the activity, reading one or more requirements of the activity based on programmable instructions embedded within the bespoke crypto-token, determining whether the one or more requirements of the activity have been satisfied based on content included within the proof of performance, and in response to the one or more requirements being satisfied, releasing the crypto token to the receiver system.

20 Claims, 10 Drawing Sheets

600

650

US 10,742,398 B2

BESPOKE PROGRAMMABLE CRYPTO TOKEN

TECHNICAL FIELD

This application generally relates to crypto tokens, and more particularly, to a crypto token that can be programmed with custom tailored constraints (or a link thereto) for releasing a crypto value of the crypto token to its holder.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any type of CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are resistant to unilateral tampering and revision due to the way such tampering is made evident instantly to all parties to the ledger. Each block contains a timestamp or sequence number and a link to a previous block. A blockchain can be used to hold, track, transfer and verify information. Since a blockchain is a distributed system, before adding a transaction to the blockchain ledger, all peers need to reach a consensus status.

Conventionally, a blockchain enables the exchange of tokens or coins that are part of a cryptocurrency (e.g., bitcoin, Zcash, etc.) Cryptocurrency is designed as a unit of exchange and is used to maintain scarcity of such assets without relying on a central bank to limit supply. Various factors can cause cryptocurrency prices to fluctuate (e.g., supply/demand, government, dilution, etc.) Tokens may be used in an exchange for fiat currency, goods, services, etc. However, tokens do not support generic constraints limiting release of value despite specialized constraints that can and have been implemented using signature schemes.

SUMMARY

One example embodiment may provide a method that includes one or more of receiving proof of performance of an activity from a receiver system, identifying a data block, among a hash-linked chain of data blocks, which includes a bespoke crypto token associated with the activity, reading one or more requirements of the activity based on programmable instructions embedded within the bespoke crypto-token, determining whether the one or more requirements of the activity have been satisfied based on content included within the proof of performance, and in response to the one or more requirements being satisfied, releasing a value of the crypto token to the receiver system.

Another example embodiment may provide a system that includes a processor and memory, wherein the processor is configured to perform one or more of receive proof of performance of an activity from a receiver system, identify a data block, among a hash-linked chain of data blocks on the distributed ledger, which includes a bespoke crypto token associated with the activity, read one or more requirements of the activity based on programmable instructions embedded within the bespoke crypto-token, determine whether the one or more requirements of the activity have been satisfied based on content included within the proof of performance, and in response to satisfaction of the one or more requirements, release a value of the crypto token to the receiver system.

A further example embodiment may provide a non-transitory computer readable medium comprising instructions, that when read by a processor, cause the processor to perform one or more of receiving proof of performance of an activity from a receiver system, identifying a data block, among a hash-linked chain of data blocks, which includes a bespoke crypto token associated with the activity, reading one or more requirements of the activity based on programmable instructions embedded within the bespoke crypto-token, determining whether the one or more requirements of the activity have been satisfied based on content included within the proof of performance, and in response to the one or more requirements being satisfied, releasing a value of the crypto token to the receiver system.

DETAILED DESCRIPTION

Figure 1:
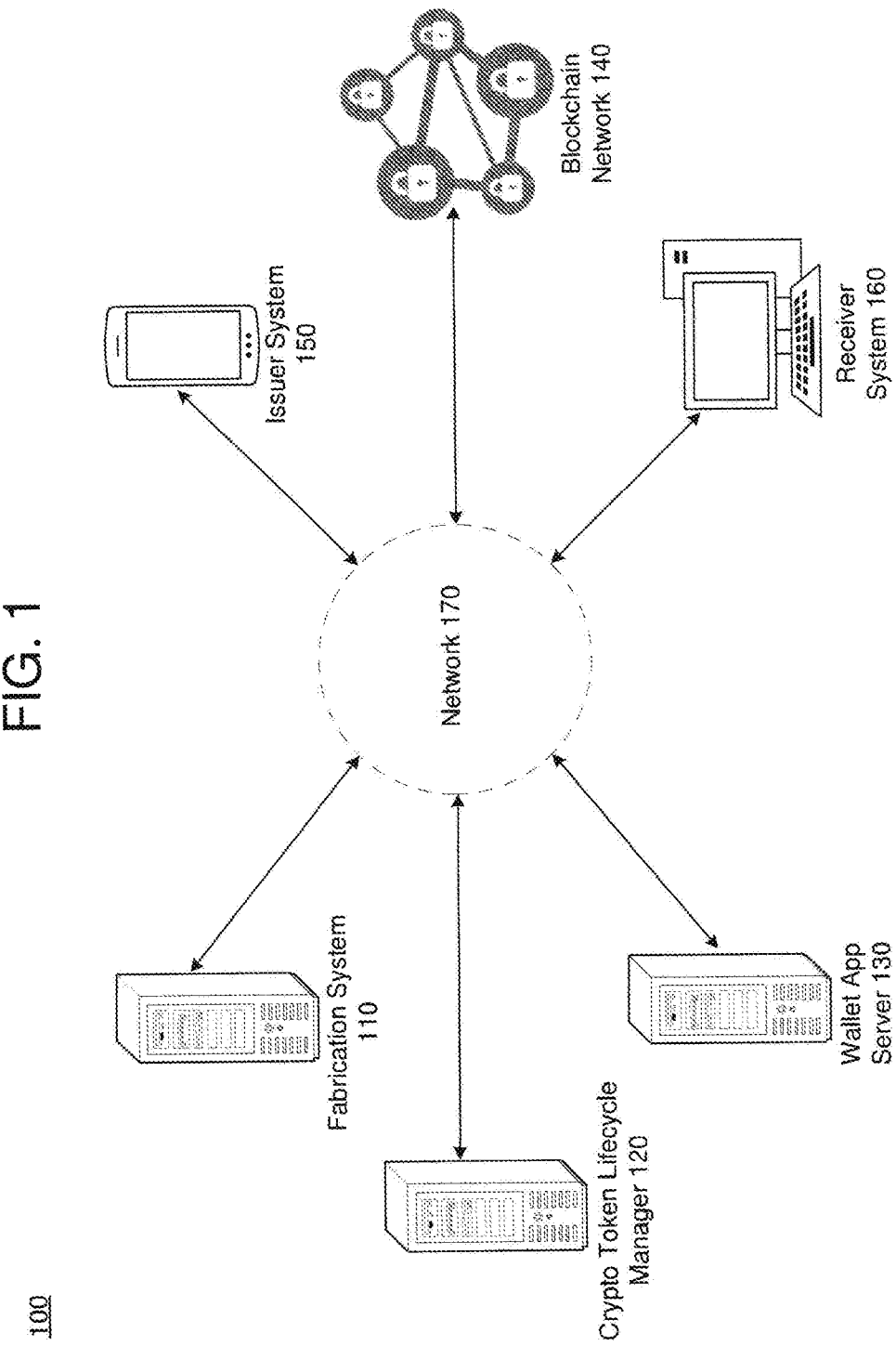
FIG. 1 is a diagram illustrating a network environment for creating and enforcing a bespoke programmable crypto token, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which provide a programmable crypto token (also referred to as crypto asset) which can be modified with constraints, conditions, etc., and may have a value (also referred to as a crypto credit) that is only be redeemable or released upon the occurrence of such constraints, conditions, etc. Enforcement of the release may be governed by a smart contract on a blockchain peer node. The crypto token may be wrapped (programmed) with various bespoke conditions therein, in contrast to the conditions being verified by users. Such conditions may be updated dynamically. A blockchain network may only release the underlying crypto credit of the crypto token when the conditions identified based on the bespoke programmable instructions of the crypto token have been satisfied.

Distributed ledger technology utilizing decentralized (peer-to-peer), distributed data structure (ledger) technology (blockchain) provides the basis for new tools that can be used as described herein to increase a velocity of money in a supply chain. In particular, this can be accomplished by utilizing blockchain to create bespoke programmable credit crypto-assets that can be tailored to the idiosyncratic needs of an extended supply chain and its members, or other types of receivers of the crypto tokens. The crypto tokens can be used, for example, by a buyer to take advantage of early payment, dynamic discounting, and the like. Unlike a cryptocurrency (e.g., such as a coin) the bespoke crypto token may not have intrinsic value but is a promise to pay/fulfill an obligation (e.g., transfer of money, goods, services, etc.) upon one or more conditions identified from programmable instructions within the crypto token being satisfied.

The example embodiments support a blockchain solution that provides the ability to generate and exchange programmable crypto tokens. Crypto tokens have traditionally been used as programmable money carrying units of value. In contrast, the technical solution of the bespoke crypto token is that the token can be programmed itself with a series of constraints or conditions. These constraints, whatever they may be, can be read and enforced by a smart contract, for example to enable redemption for a cash payment. Some of the benefits of such a solution provide for tokens with uniquely tailored value that is tied to a particular activity, holder/receiver, owner, and the like, thereby enabling customized and extremely secure exchange of money. Furthermore, the system can expedite a velocity of money transfer within a supply chain system increasing profits and productivity.

To program a token with conditions/constraints, the conditions/constraints may be written to the token data structure. As another example, the token data structure may be embedded with a link, which may be a hash, to an on-chain or off-chain database. This is a new technical pattern for this area. The embodying system may include a fabrication system, a system for the token lifecycle (e.g., creation, distribution, destruction, etc.), a wallet application, and a blockchain.

In some embodiments, the programmable instructions of the crypto token may be securely and dynamically updated. For example, the issuer of the token may change an interest rate parameter and cause the bespoke programmable crypto token to be dynamically updated with this new parameter within the token data structure. Here, an entity such as the fabrication system, a smart contract, a banking system, or the like, may automatically detect and submit a request to the blockchain identifying the crypto token and the updated parameter. Prior to recording the change within the blockchain, the blockchain network may authenticate the entity to ensure security, the parameter being updated, etc., and make the change to the bespoke programmable crypto token to include the updated feature. The updated crypto token may be stored on a new block within the blockchain.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the bespoke programmable crypto token is implemented due to a smart contract and a decentralized/distributed scheme which are inherent and unique to blockchain.

In particular, the conditioning of the exchange of a value of the crypto token may be enforced upon the occurrence of one or more constraints and/or conditions being satisfied. However, rather than the constraints or conditions being written into the deterministic logic of an external application, such as a smart contract, the constraints or conditions are embedded within instructions programmed within the crypto token or programmed within a storage which is linked through programmable instructions within the crypto token which can be read by issuers, recipients, smart contracts, and third parties depending upon privacy constraints, and verified by reference to the blockchain. The crypto token may increase the rate at which payments are exchanged, and in so doing increase the velocity of money, through programmable credit crypto-assets. In doing so, the programmable transfer of value can be provided in the form of a promise to pay or a credit in response to a given occurrence being read by a smart contract. Because crypto tokens run on distributed systems via blockchain, the crypto credit enables the use of the token across networks with potentially previously unknown participants.

Meanwhile, a traditional database could not be used to implement the example embodiments because crypto tokens require a blockchain for decentralized distribution and for exchange and verification. Furthermore, the bespoke programmable crypto token comes alive through a smart contract which is not present within a traditional database.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

FIG. 1 illustrates a network environment 100 for creating and enforcing a bespoke programmable crypto token, according to example embodiments. Referring to FIG. 1, the network environment 100 may include a fabrication system 110 for creating new crypto tokens, a crypto token lifecycle management system 120 for monitoring and managing lifecycle events such as creation, distribution, destruction, and the like, of the crypto tokens, a wallet app server 130 for displaying crypto token account balances in both the issuer and receiver accounts and reading token parameters, a blockchain network 140 for storing and exchanging crypto tokens, an issuer system 150 and a receiver system 160 (e.g., supply chain, etc.) which may be a receiver of a crypto token of the issuer system 150 stored in a digital wallet managed by wallet app server 130.

In an implementation of the system, an issuing enterprise such as the fabrication system 110 may create a class of bespoke, parameterized crypto-assets that represent credit to the receiver 160 and promises to pay by the issuer 150. The crypto assets (hereinafter referred to as crypto tokens) may be a promise to pay that is only redeemable upon the verification of one or more conditions wrapped within the programmable instructions of the crypto token. The issued crypto tokens may be created by the fabrication system 110 and received, stored and further distributed by entities such as the issuer system 150 and the receiver system 160 utilizing a crypto-wallet hosted by wallet app server 130. Through the wallet, the receiver can read the identity of the issuing enterprise, the balances of classes of crypto tokens that it holds, and their respective parameters.

The crypto token lifecycle management system 120 may monitor and track progress and changes to a bespoke crypto token. For example, the crypto token lifecycle management system 120 may store information about who currently has control over the crypto token, who provided the token, constraints associated with the token, an expiry of the token, and the like. Furthermore, the crypto token lifecycle management system 120 may also trigger the destruction of the crypto token at the end of its lifecycle.

The programmable instructions or credit parameters of the crypto token provide its provenance, vintage, and associated terms and conditions, including: who can present the crypto token for redemption, how and when can presentment be accomplished, can it be redeemed for cash, and if so, in what currency, can the value upon redemption be limited to a specific geography, is redemption limited to specified goods and services, can the crypto-credit be transferred to a third party with the same rights as the initial recipient, or is transfer allowed only for a specific purpose, will interest be paid on a periodic basis until redemption, is there an expiration date for the crypto-credit, or is it subject to negative interest, is the crypto-credit secured against a tangible asset, in case of disagreement, what law applies and what are the dispute resolution mechanisms, and the like.

The parameters can be stored in the token itself, or may be stored in an on-chain or off-chain database referenced by a hashed identifier stored within the token. In either case, the programmable instructions provide either the parameters themselves or a direct link to a storage holding the parameters. Once created, crypto token ownership data, including transfers, are recorded in the blockchain 140. The transparency of the blockchain 140 allows the original issuer to track and trace the flow and amount of crypto tokens across a supply chain. By design, the issuer 150 can enable other parties in the supply chain to do the same. This transparency can be limited to supply chain members, or can be extended to the public, depending upon how the issuer 150 chooses to build privacy and confidentiality into the blockchain design.

To enforce rules, the issuer 150 may utilize tools, such as multi-signature wallets, to block others from holding the crypto tokens or freeze further transfer. Additional rules can be enforced through the use of deterministic logic stored in the blockchain 140, referred to as a "smart contract" or chaincode. This enables, for example, the issuer 150 to limit use of a crypto tokens to pay a third party (e.g., receiver 160, etc.) supplying a quantity of a particular item. The supplier invoice, as read by the smart contract, can trigger the release of the crypto token in the requisite amount to the third party in satisfaction of the invoice. Additional logic may allow the third party to factor the crypto tokens and transfer it to others. By all these means, the issuer can increase the velocity of money within the supply chain with the result of more frequent cash turns that boost sales and profits. The release may make the crypto token exchangeable or otherwise redeemable for fiat currency, goods, services, etc.

Figure 2A:
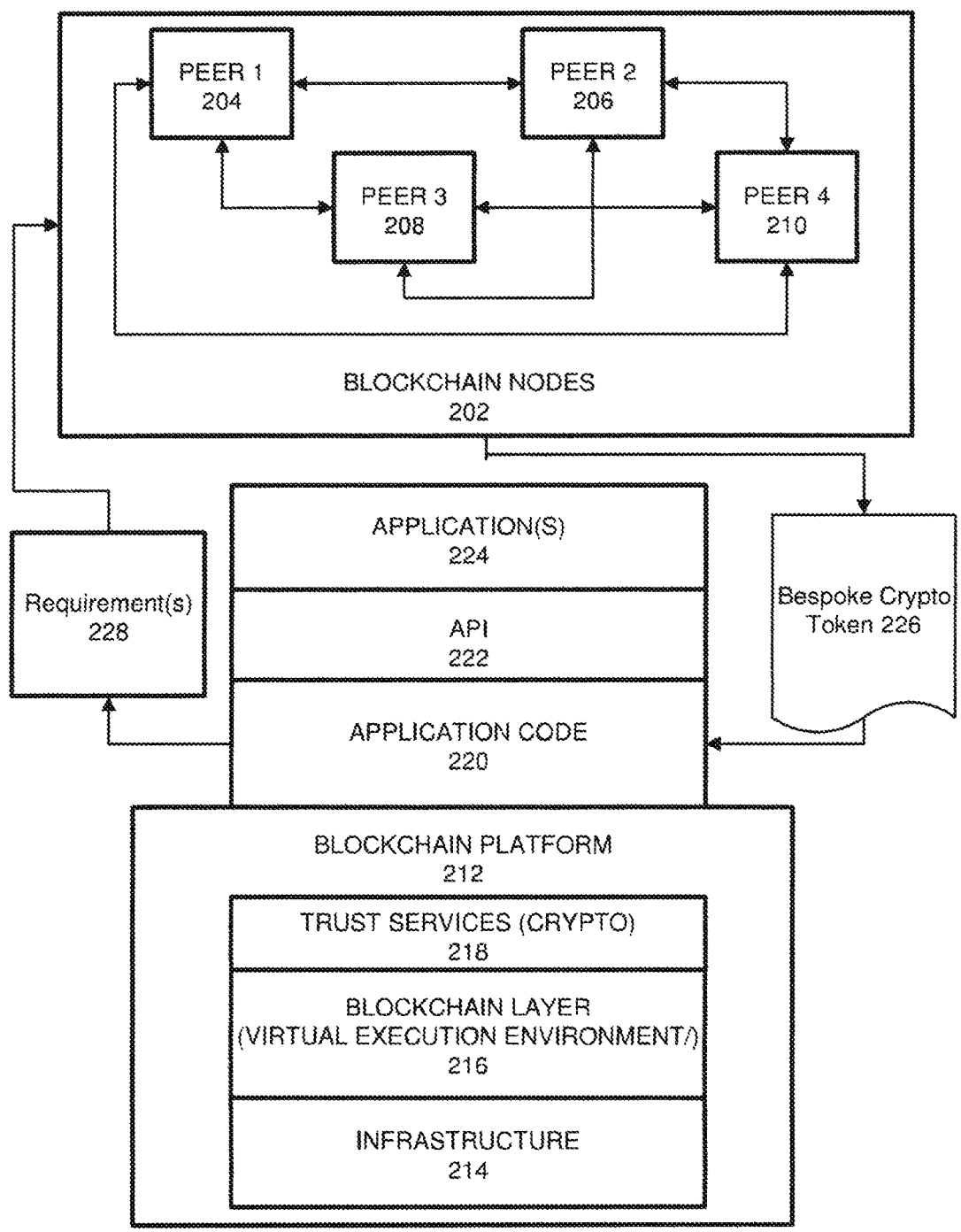
FIG. 2A is a diagram illustrating a peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, bespoke programmable crypto token 226 may be processed by one or more processing entities (e.g., virtual machines) included in the blockchain layer 216. One or more requirements 228 (e.g., conditions, requirements, parameters, etc.) may be read from the programmable crypto token 226. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
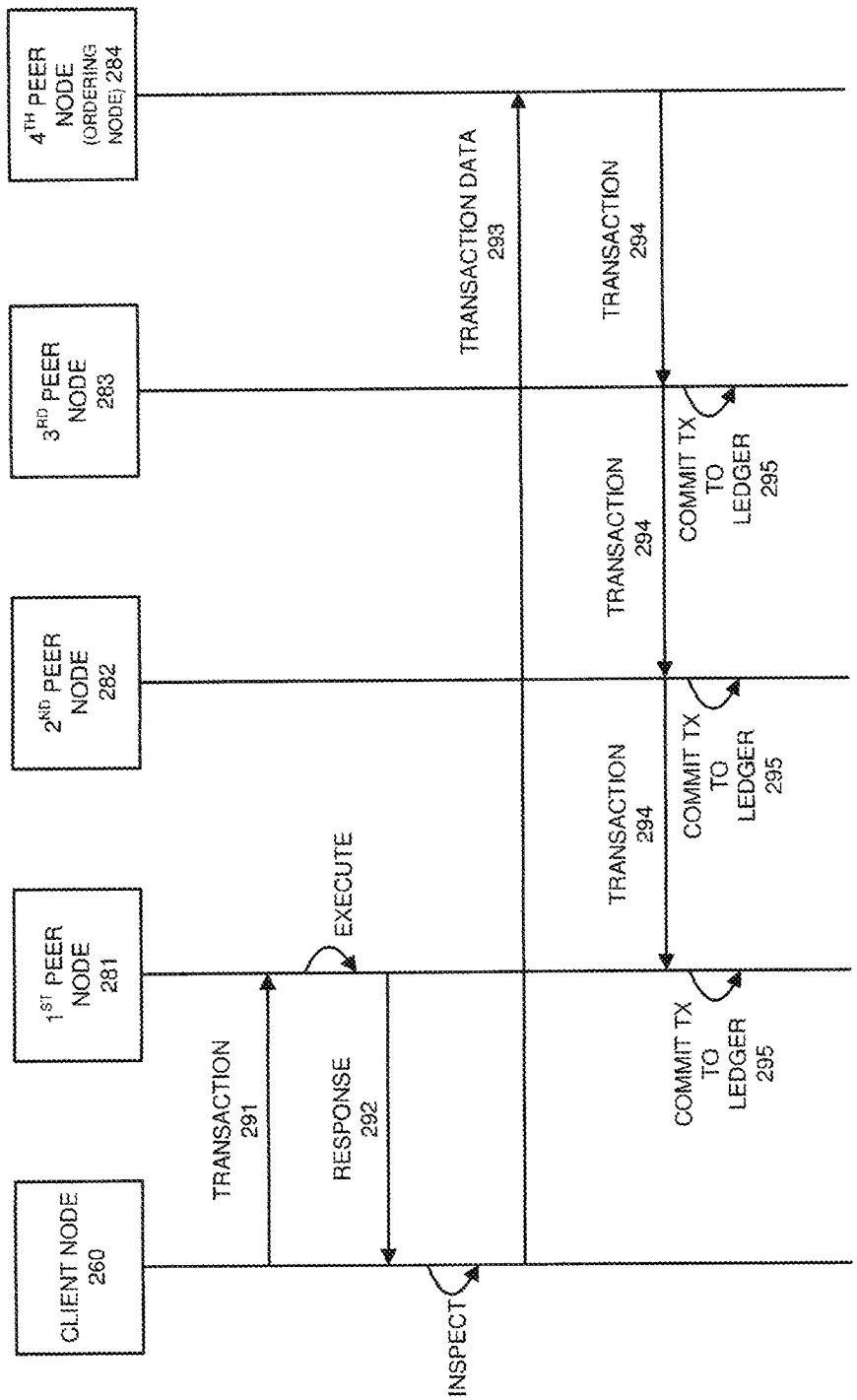
FIG. 2B is a diagram illustrating a peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
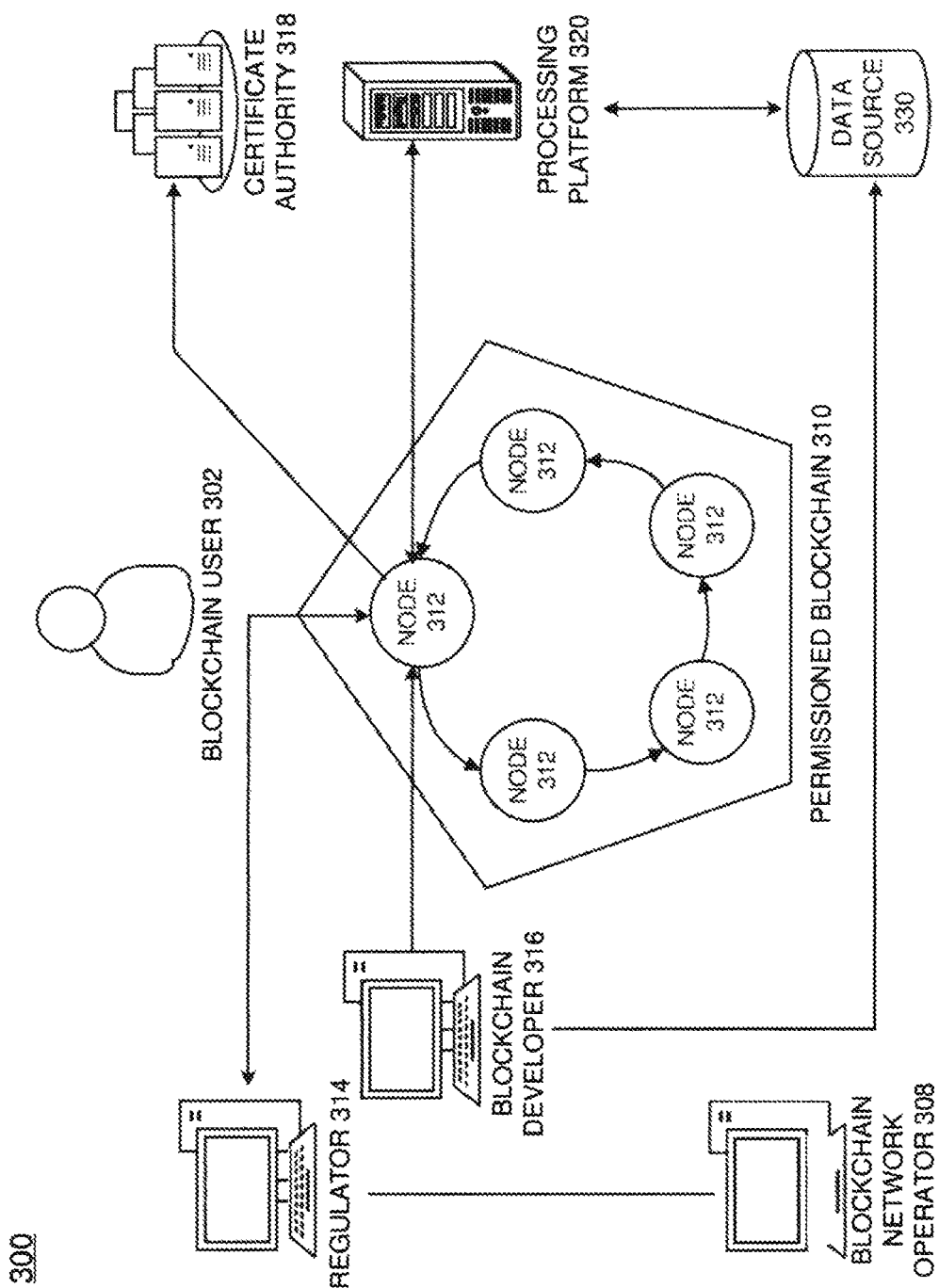
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a request to create, store, destroy, modify, etc., a bespoke programmable crypto token, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
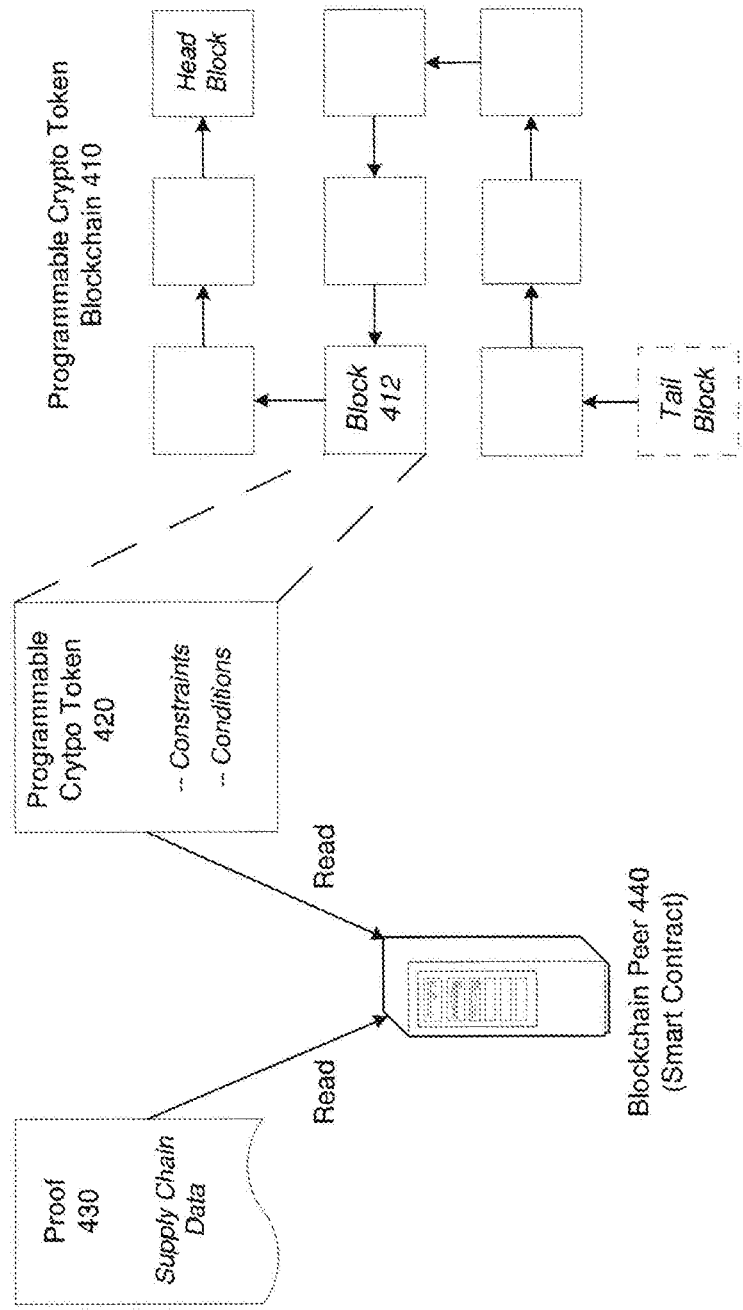
FIG. 4A is a diagram illustrating a process of a blockchain peer determining whether a bespoke programmable crypto token has been satisfied, according to example embodiments.
Figure 4B:
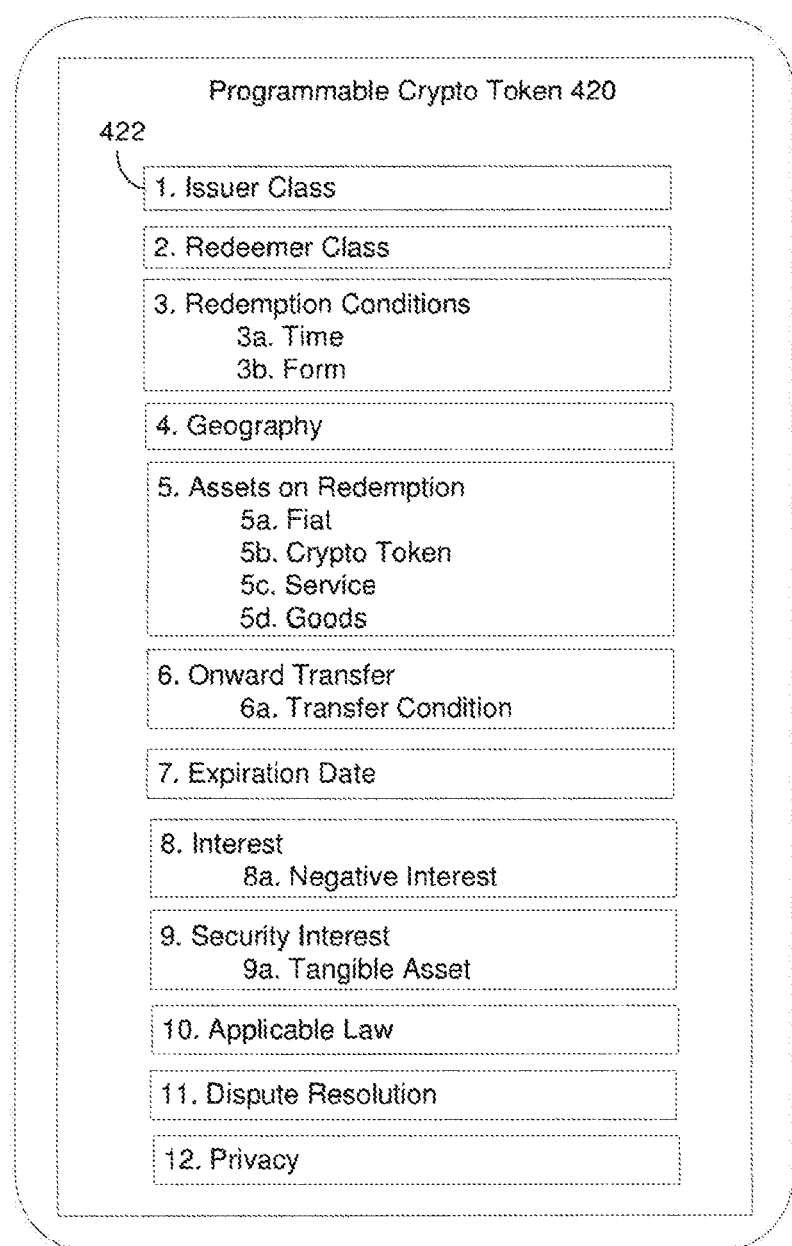
FIG. 4B is a diagram illustrating an example of programmable content of a bespoke programmable crypto token according to example embodiments.

FIG. 4A illustrates a process 400 of a blockchain peer 440 determining whether conditions of a bespoke programmable crypto token 420 have been satisfied, according to example embodiments, and FIG. 4B illustrates an example of programmable instructions which may be embedded within or otherwise linked to the bespoke programmable crypto token 420. According to various embodiments, an enterprise may create and issue a unique class of bespoke, parameterized crypto tokens 420 (crypto credits) that represent an obligation of the enterprise (e.g., a promise to pay) to the receiver. The parameters, which represent conditions or constraints on the promise to pay, can be written to the internal data structure of the crypto token, or to an on- or off-chain database with a linking identifier, e.g., a hash of the constraints, written to the data structure of the crypto token 420.

The enterprise may distribute the crypto token 420 to a receiver and the transaction may be recorded in a blockchain 410 and reflected in crypto wallet balances. Here, the blockchain 410 includes a hash-linked chain of blocks where each subsequent block contains a hash link (pointer) to an immediately previous block in the blockchain. As transactions are recorded, the links are created making each transaction immutable. In this example, the crypto token 420 and its transaction details may be recorded in data block 412 of the blockchain 410. When the receiver submits a proof of performance of an activity (e.g., a sale, an exchange, etc.) in the form of a provable item such as a receipt, a document, an invoice, etc., the blockchain peer 440 may compare content within the proof of performance to the constraints identified/read based on the programmable instructions within the crypto token 420. When the constraints are satisfied, the blockchain peer 440 may release or otherwise make redeemable (e.g., set a flag, bit, etc.) to indicate that a value of the crypto token is redeemable. As another example, the blockchain peer 440 may release the actual funds/assets to the receiver.

Through a crypto wallet, the receiver can read the identity of the issuing enterprise, the balances of classes of crypto tokens that it holds, and their respective constraints/conditions (which can be read from either the crypto token or an on- or off-chain database). The transparency of the blockchain 410 allows the enterprise to track and trace the flow and amount of crypt tokens across the supply chain, as well as the crypto token constraints/conditions. In some embodiments, using private blockchain channels, the enterprise may enable receivers to view the flow of crypto tokens to all or select blockchain participants.

To enforce rules, the issuer may utilize tools, such as a smart contract on blockchain peer 440 and multi-signature wallets to block others from holding the crypto tokens or freeze further transfer. In some embodiments, the enterprise may limit use of a crypto token issued to a particular receiver to pay a third-party supplier on specified type of invoice. Here, the invoice is submitted to the smart contract of the blockchain peer 440, which reads the parameters stored in the crypt token 420 or an on-chain or off-chain database and decides whether to allow the transaction. If redemption is allowed, the smart contract may settle by transferring funds to the third-party supplier and destroying the token. As another example, the smart contract may release or unlock a value of the crypto token 420 (otherwise making the token exchangeable for value/assets). Furthermore, all token events may be written to the blockchain 410.

In some embodiments, the programmable instructions of the crypto token 420 may be securely and dynamically updated. For example, the issuer of the crypto token 420 may change an interest rate parameter (or any other parameter such as shown in FIG. 4B) and cause the bespoke programmable crypto token 420 to be dynamically updated with this new parameter within the token data structure. Here, an entity such as the fabrication system, a smart contract, a banking system, or the like, may automatically detect and submit a request to the blockchain 410 identifying the crypto token and the updated parameter. Prior to recording the change within the blockchain 410, the blockchain network may authenticate the entity to ensure security, the parameter being updated, etc., and make the change to the bespoke programmable crypto token to include the updated feature. The updated crypto token may be stored on a new block within the blockchain 410.

FIG. 4B illustrates an example of programmable content of a bespoke programmable crypto token 420 according to example embodiments. It should be appreciated that the content of the crypto token 420 is merely for purposes of example and is not limited to the programmable data shown in FIG. 4B. In this example, the crypto token 420 includes a plurality of parameters 422 which may be written within the crypto token 420, or stored on a separate storage and linked via a hash or other identifier programmed within the crypto token 420. In this example, the parameters 422 identify an issuer, a receiver, and one or more requirements for redeeming an underlying value of the crypto token 420. In some cases, the parameters 422 may also identify what type of assets the crypto token value represents, and may include onward transfer options. In some cases, the parameters 422 may also include a limit on geographical use, identify security interests taken by the receiver, an expiry, applicable laws, privacy regulations, mediation rules, and the like.

Figure 5:
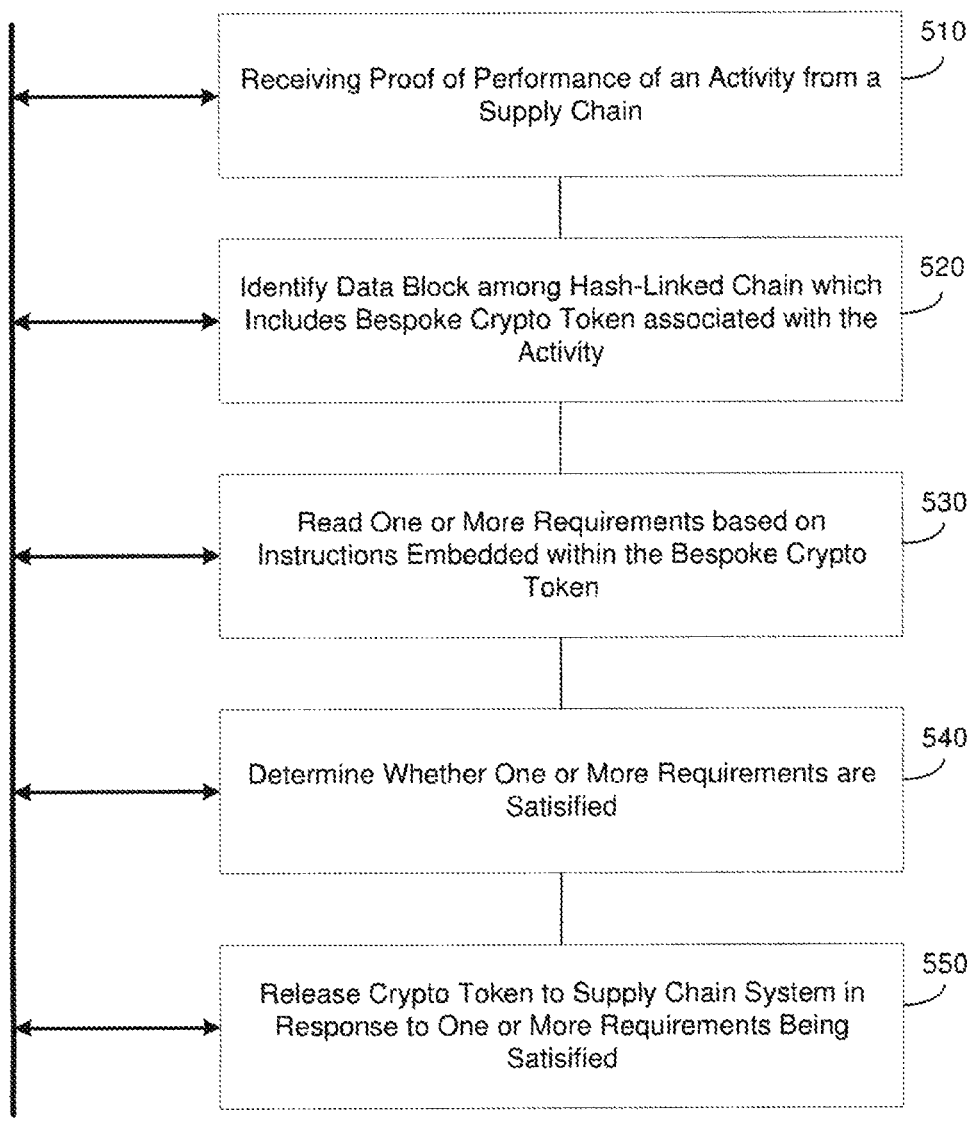
FIG. 5 is a diagram illustrating a method for enforcing one or more requirements of a bespoke programmable crypto token, according to example embodiments.

FIG. 5 illustrates a method 500 for enforcing one or more requirements of a bespoke programmable crypto token, according to example embodiments. For example, the method 500 may be performed by a blockchain peer, a server, a cloud platform, and the like. Referring to FIG. 5, in 510, the method may include receiving proof of performance of an activity from a receiver system. For example, the receiver system may be a holder of a bespoke crypto token and the proof may be an invoice, an image, a document, a signature, and the like, validating performance of an activity (e.g., sale of a good, service, supply chain action, etc.) to an owner of the crypto token.

In 520, the method may include identifying a data block, among a hash-linked chain of data blocks, which includes a bespoke crypto token associated with the activity. For example, the hash-linked chain of blocks may be included within a blockchain stored/replicated among a network of blockchain peer nodes. For example, the owner may exchange the crypto token before performance of the activity is due. Here, the token may be tailored based on performance of a specific activity to be performed between the owner and the receiver (holder). For example, the two parties may be entered within a contract for the purchase of goods, sale of services, exchange of assets, and the like.

In 530, the method may include reading one or more requirements of the activity based on programmable instructions embedded within the bespoke crypto-token, and in 540, determining whether the one or more requirements of the activity have been satisfied based on content included within the proof of performance provided from the receiver. For example, a smart contract may identify one or more requirements (constraints, conditions, etc.) embedded within the crypto token stored on the blockchain ledger, and determine whether such requirements have been satisfied based on content read or otherwise extracted from the proof of performance.

As one non-limiting example, the proof of performance may be an invoice, and the smart contract may read details of the invoice (parties involved, amount, items sold/exchanged, etc.) and determine whether the conditions of the crypto token are satisfied based thereon. Furthermore, in response to the one or more requirements being satisfied, in 550, the blockchain peer (e.g., smart contract) may release a value (e.g., crypto credit) of the crypto token to the receiver system.

In some embodiments, the programmable instructions embedded within the bespoke crypto token may include the one or more requirements written therein. As another example, the programmable instructions embedded within the bespoke crypto token may include a link to a storage storing the one or more requirements. Here, the storage may be a separate storage node that is located off of the blockchain (i.e., off-chain) or it may be located within the blockchain such as another block. The bespoke crypto token may include a data structure that is programmed with customizable requirements which are enforceable by a smart contract executing on the peer node. In some embodiments, the proof of performance (e.g., the invoice, etc.) may be stored on the blockchain via one or more blocks and may be identified by the smart contract. In some embodiments, the method may further include transmitting a notification of the release of the crypto token to a digital wallet associated with the receiver system and update an account of the receiver system.

Figure 6A:
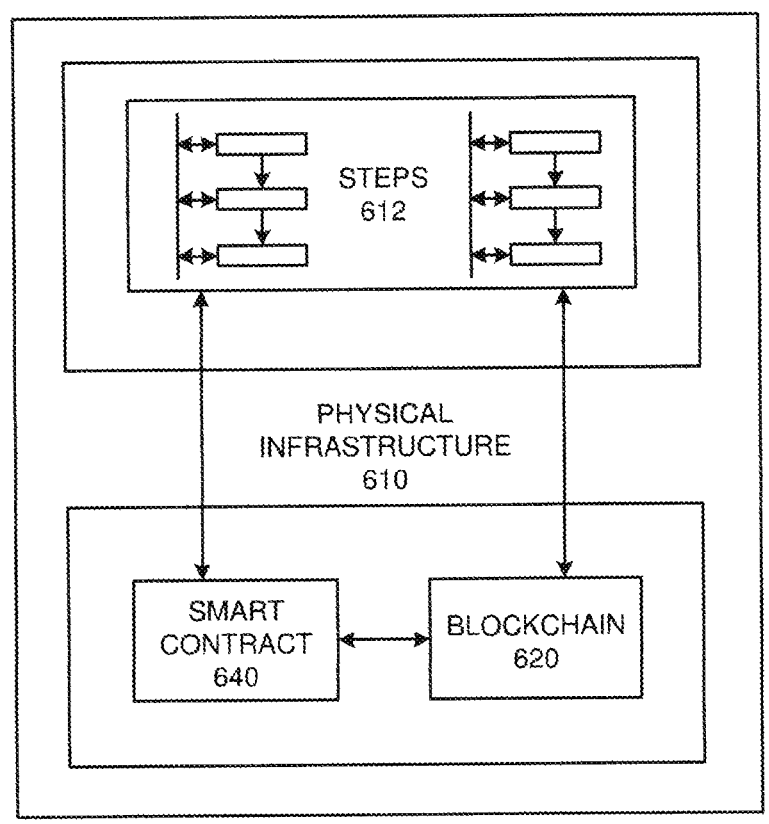
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 630, which may execute any of the operational steps 612 included in any of the example embodiments. The steps/operations 612 may include one or more of the steps described or depicted in one or more flow diagrams and/or logic diagrams. The steps may represent output or written information that is written or read (e.g., requirements of a bespoke programmable crypto token) from one or more smart contracts 630 and/or blockchains 620 that reside on the physical infrastructure 610 of a computer system configuration. The data can be output from an executed smart contract 630 and/or blockchain 620. The physical infrastructure 610 may include one or more computers, servers, processors, memories, and/or wireless communication devices.

Figure 6B:
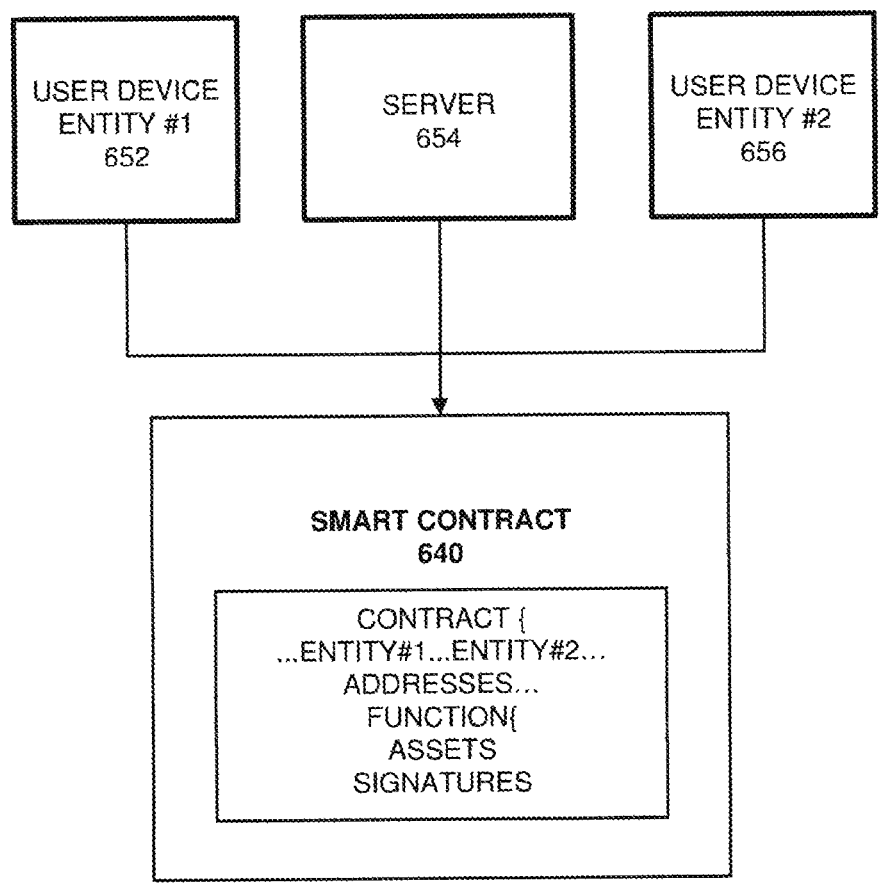
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain as a blockchain transaction. For example, the smart contract may read constraints or other requirements from a programmable crypto token and compare the read constraints to content within a proof of performance provided by a receiver, to determine whether a value of the programmable crypto token should be released to a holder of the crypto token.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
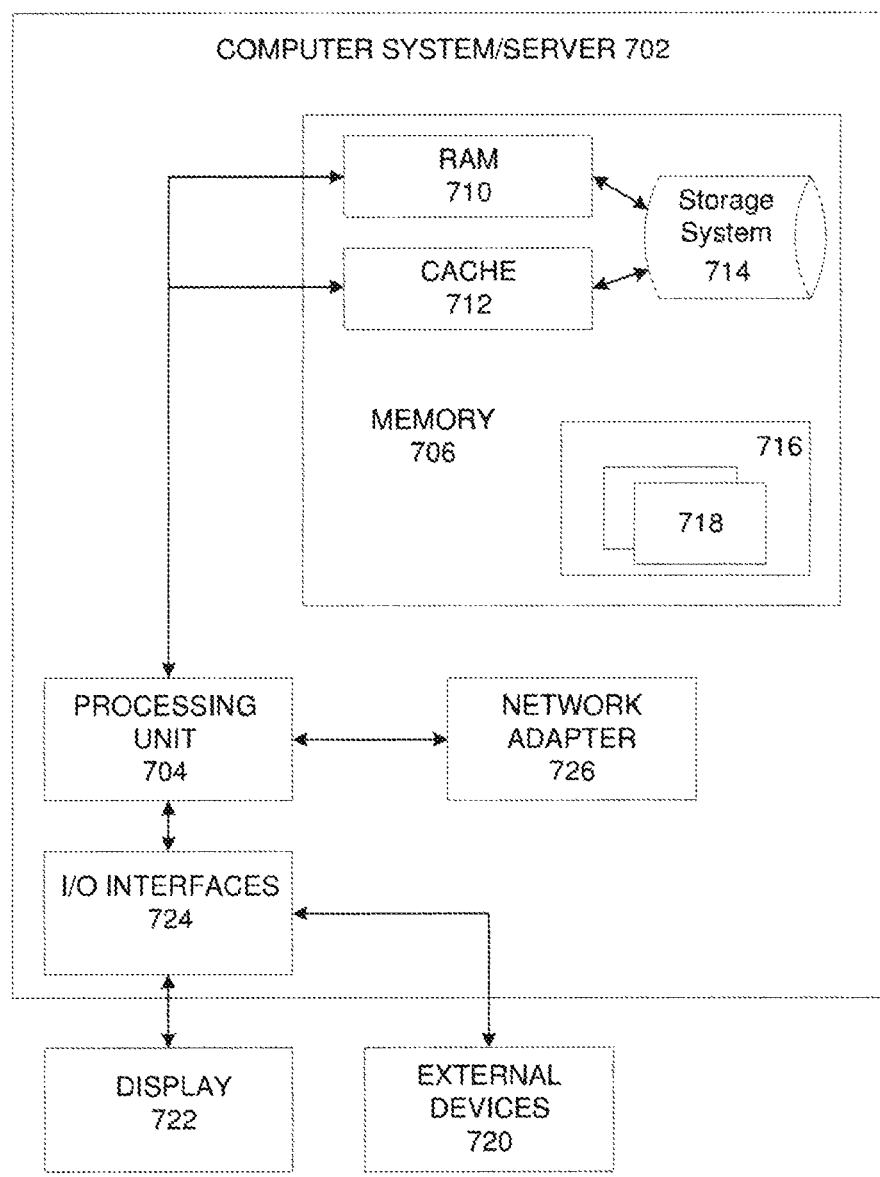
FIG. 7 is a diagram illustrating a computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, smart phones, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

According to various embodiments, the processor 704 may receive proof of performance of an activity from a receiver system. For example, the proof may be a file, a document, an image, and the like. The proof may include content verifying completion of an activity such as an order, a sale, an exchange, etc. The proof may identify a supply chain or other receiver of a bespoke crypto token who performed the activity under an obligation to a user who transferred the crypto token. The receiver may create the proof and store the proof on the blockchain in some examples. The processor 704 may identify a data block, among a hash-linked chain of data blocks on the blockchain, which includes the bespoke crypto token associated with the activity.

The processor 704 may read one or more requirements of the activity based on programmable instructions embedded within the bespoke crypto-token. Here the programmable instructions may include one or more conditions, constraints, etc. of performance of the activity which must be verified before a value of the crypto token is released or otherwise provided to the receiver. The processor 704 (e.g., via execution of a smart contract/chain code) may determine whether the one or more requirements of the activity have been satisfied based on content included within the proof of performance. For example, the processor 704 may extract content from the uploaded proof and compare it to the one or more requirements obtained based on the bespoke programmable crypto token. In response to a determination of satisfaction of the one or more requirements, the processor 704 may release a value of the crypto token to the receiver system (e.g., via a digital wallet, etc.)

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
   a memory configured to store a distributed ledger; and
   a processor configured to:
      receive proof of performance of an activity from a receiver system;
      identify a data block, among a hash-linked chain of data blocks on the distributed ledger, which includes a bespoke crypto token associated with the activity;
      read one or more requirements of the activity based on programmable instructions embedded within the bespoke crypto-token;
      determine whether the one or more requirements of the activity have been satisfied based on content included within the proof of performance; and
      in response to a determination of satisfaction of the one or more requirements, release a value of the crypto token to the receiver system.

2. The computing system of claim 1, wherein the programmable instructions embedded within the bespoke crypto token comprise the one or more requirements written therein and configured to be read by the processor.

3. The computing system of claim 1, wherein the programmable instructions embedded within the bespoke crypto token comprise a link to a storage that stores the one or more requirements.

4. The computing system of claim 1, wherein the data block is stored within a hash-linked chain of blocks on a blockchain.

5. The computing system of claim 1, wherein the bespoke crypto token comprises a data structure that is programmed with customizable requirements that are enforceable by a smart contract.

6. The computing system of claim 1, wherein the received proof of performance comprises an invoice that is submitted and stored via a data block of the hash-linked chain of data blocks.

7. The computing system of claim 1, wherein the computing system further comprises a network interface configured to transmit a notification of the release of the crypto token to a digital wallet or smart contract associated with the receiver system.

8. A method comprising:
   receiving proof of performance of an activity from a receiver system;
   identifying a data block, among a hash-linked chain of data blocks, which includes a bespoke crypto token associated with the activity;
   reading one or more requirements of the activity based on programmable instructions embedded within the bespoke crypto-token;
   determining whether the one or more requirements of the activity have been satisfied based on content included within the proof of performance; and
   in response to the one or more requirements being satisfied, releasing the crypto token to the receiver system.

9. The method of claim 8, wherein the programmable instructions embedded within the bespoke crypto token comprise the one or more requirements written therein.

10. The method of claim 8, wherein the programmable instructions embedded within the bespoke crypto token comprise a link to a storage storing the one or more requirements.

11. The method of claim 8, wherein the data block is stored within a hash-linked chain of blocks on a blockchain.

12. The method of claim 8, wherein the bespoke crypto token comprises a data structure that is programmed with customizable requirements that are enforceable by a smart contract.

13. The method of claim 8, wherein the proof of performance comprises an invoice that is submitted and stored via a data block of the hash-linked chain of data blocks.

14. The method of claim 8, further comprising transmitting a notification of the release of the crypto token to a digital wallet or smart contract associated with the receiver system.

15. A non-transitory computer readable medium comprising instructions, that when read by a processor, cause the processor to perform:
   receiving proof of performance of an activity from a receiver system;
   identifying a data block, among a hash-linked chain of data blocks, which includes a bespoke crypto token associated with the activity;
   reading one or more requirements of the activity based on programmable instructions embedded within the bespoke crypto-token;
   determining whether the one or more requirements of the activity have been satisfied based on content included within the proof of performance; and
   in response to the one or more requirements being satisfied, releasing the crypto token to the receiver system.

16. The non-transitory computer readable medium of claim 15, wherein the programmable instructions embedded within the bespoke crypto token comprise the one or more requirements written therein.

17. The non-transitory computer readable medium of claim 15, wherein the programmable instructions embedded within the bespoke crypto token comprise a link to a storage storing the one or more requirements.

18. The non-transitory computer readable medium of claim 15, wherein the data block is stored within a hash-linked chain of blocks on a blockchain.

19. The non-transitory computer readable medium of claim 15, wherein the bespoke crypto token comprises a data structure that is programmed with customizable requirements which are enforceable by a smart contract.

20. The non-transitory computer readable medium of claim 15, wherein the proof of performance comprises an invoice that is submitted and stored via a data block of the hash-linked chain of data blocks.

* * * * *